(12) United States Patent
Perkinson

(10) Patent No.: US 9,381,997 B2
(45) Date of Patent: Jul. 5, 2016

(54) PROPELLER PITCHLOCK SYSTEM WITH A ROTATING INTERFACE

(71) Applicant: Hamilton Sundstrand Corporation, Windsor Locks, CT (US)

(72) Inventor: Robert H. Perkinson, Stonington, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 429 days.

(21) Appl. No.: 13/965,616

(22) Filed: Aug. 13, 2013

(65) Prior Publication Data

US 2015/0050149 A1   Feb. 19, 2015

(51) Int. Cl.
*B64C 11/32* (2006.01)

(52) U.S. Cl.
CPC .............. *B64C 11/32* (2013.01); *B64C 11/325* (2013.01); *Y10T 29/49826* (2015.01)

(58) Field of Classification Search
CPC .............................. B64C 11/32; B64C 11/325
See application file for complete search history.

(56) References Cited

U.S. PATENT DOCUMENTS

| | | | |
|---|---|---|---|
| 2,116,818 A * | 5/1938 | Ellsworth | B64C 11/325 416/157 R |
| 5,161,948 A | 11/1992 | Carvalho et al. | |
| 5,186,608 A * | 2/1993 | Bagge | B64C 11/38 416/147 |
| 8,267,656 B2 | 9/2012 | Carvalho et al. | |
| 8,376,466 B2 | 2/2013 | Kladde | |
| 8,517,311 B2 | 8/2013 | Marini | |
| 8,585,146 B1 | 11/2013 | Giasson et al. | |
| 8,672,399 B2 | 3/2014 | Brunner et al. | |
| 8,784,055 B2 * | 7/2014 | Perkinson | B64C 11/38 416/1 |
| 2007/0212220 A1 | 9/2007 | Perkinson et al. | |

FOREIGN PATENT DOCUMENTS

| | | |
|---|---|---|
| EP | 1832509 A2 | 9/2007 |
| EP | 1832510 A2 | 9/2007 |

OTHER PUBLICATIONS

European Search Report for Application No. 14180684.4-1754:Mailed Feb. 23, 2015; 4 pages.

* cited by examiner

Primary Examiner — Mary A Davis
(74) Attorney, Agent, or Firm — Cantor Colburn LLP

(57) ABSTRACT

A pitchlock system includes a ballscrew screw mounted along an axis of rotation of an actuator, the ballscrew screw has an internal ballscrew bore; a pitchlock nut mounted about the ballscrew screw, the pitchlock nut including an internal pitchlock nut thread; a ballscrew ballnut mounted about the ballscrew screw and axially adjacent the pitchlock nut; a pitchlock actuation rod mounted axially within the internal ballscrew bore, the pitchlock actuation rod having an internal pitchlock actuation bore and a ball bearing aperture for receiving multiple ball bearings; a pitchlock retainer pin mounted axially within the internal pitchlock actuation bore; and a belleville spring which biases the ballscrew screw towards an axially fixed surface of the actuator in a pitchlock position, the ballscrew screw being movable between an operational position and the pitchlock position.

16 Claims, 6 Drawing Sheets

PROPELLER PITCHLOCK SYSTEM WITH A ROTATING INTERFACE

FIELD OF INVENTION

This invention generally relates to propeller systems and, more particularly, to a variable pitch propeller having a pitchlocking system with a simplified pitchlock actuation rod connected to a rotating interface.

DESCRIPTION OF RELATED ART

Typical variable pitch propeller systems include a plurality of blades that are pivotably mounted to a rotary hub assembly. The blades rotate about a hub axis and are driven by an aircraft engine. The blades are operatively connected to a mechanical or hydromechanical blade pitch change system that may change a pitch angle of the blades while they rotate. Conventional blade pitch change systems are typically disposed within the hub assembly and include a pitchlock system. The pitchlock system includes a pitchlock ballscrew connected to a pitchlock ballnut that is in mechanical communication with a pitchlock piston. The pitchlock system maintains blade pitch in the event of a malfunction caused by, for example, a loss in the blade pitch system's hydraulic supply. Such systems have proven suitable for their intended purpose.

BRIEF SUMMARY

According to one aspect of the invention, a pitchlock system includes a ballscrew screw mounted along an axis of rotation of an actuator, the ballscrew screw having an internal ballscrew bore; a pitchlock nut mounted about the ballscrew screw, the pitchlock nut including an internal pitchlock nut thread; a ballscrew ballnut mounted about the ballscrew screw and axially adjacent the pitchlock nut; a pitchlock actuation rod mounted axially within the internal ballscrew bore, the pitchlock actuation rod having an internal pitchlock actuation bore and a ball bearing aperture for receiving multiple ball bearings; a pitchlock retainer pin mounted axially within the internal pitchlock actuation bore; and a belleville spring which biases the ballscrew screw towards an axially fixed surface of the actuator in a pitchlock position, the ballscrew screw being movable between an operational position and the pitchlock position.

According to another aspect of the invention, a method of assembling a pitchlock system includes mounting a pitchlock nut about a ballscrew screw, the ballscrew screw having an internal ballscrew screw bore and an external ballscrew ball track groove; mounting a ballscrew ballnut about the ballscrew screw and axially adjacent the pitchlock nut; inserting a pitchlock actuation rod axially within the internal ballscrew screw bore to form a ballscrew screw assembly, the pitchlock actuation rod having an internal pitchlock actuation bore from a forward end to a second aft end and a ball bearing aperture; compressing a belleville spring assembly against an external face of an actuator dome cover; inserting the forward end of the pitchlock actuation rod into the belleville spring assembly from an internal cavity of the actuator dome cover; and inserting a pitchlock retainer pin axially within the internal pitchlock actuation bore to compress the belleville spring assembly to the actuator dome cover.

In another aspect of the invention, a propulsion system includes an actuator mounted along an axis, the actuator having an actuator dome that defines an actuator cavity; a ballscrew screw mounted along an axis of rotation of an actuator, the ballscrew screw having an internal ballscrew bore; a pitchlock nut mounted about the ballscrew screw, the pitchlock nut including an internal pitchlock nut thread; a ballscrew ballnut mounted about the ballscrew screw and axially adjacent the pitchlock nut; a pitchlock actuation rod mounted axially within the internal ballscrew bore, the pitchlock actuation rod having an internal pitchlock actuation bore and a ball bearing aperture for receiving multiple ball bearings; a pitchlock retainer pin mounted axially within the internal pitchlock actuation bore; and a belleville spring which biases the ballscrew screw towards an axially fixed surface in the actuator in a pitchlock position, the ballscrew screw being movable between an operational position and the pitchlock position.

Other aspects, features, and techniques of the invention will become more apparent from the following description taken in conjunction with the drawings.

BRIEF DESCRIPTION OF THE SEVERAL VIEWS OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Embodiments of a pitchlock system include a novel ballscrew screw that is configured to receive a pitchlock actuation rod. The pitchlock actuation rod is mounted within the ballscrew screw and may be configured to receive ball bearings through a ballbearing bore provided within a body of the pitchlock actuation rod. A pitchlock retainer pin mounted axially within the pitchlock actuation rod retains the plurality of ball bearings in engagement with the ballscrew screw and a ballscrew ballnut.

Figure 1:
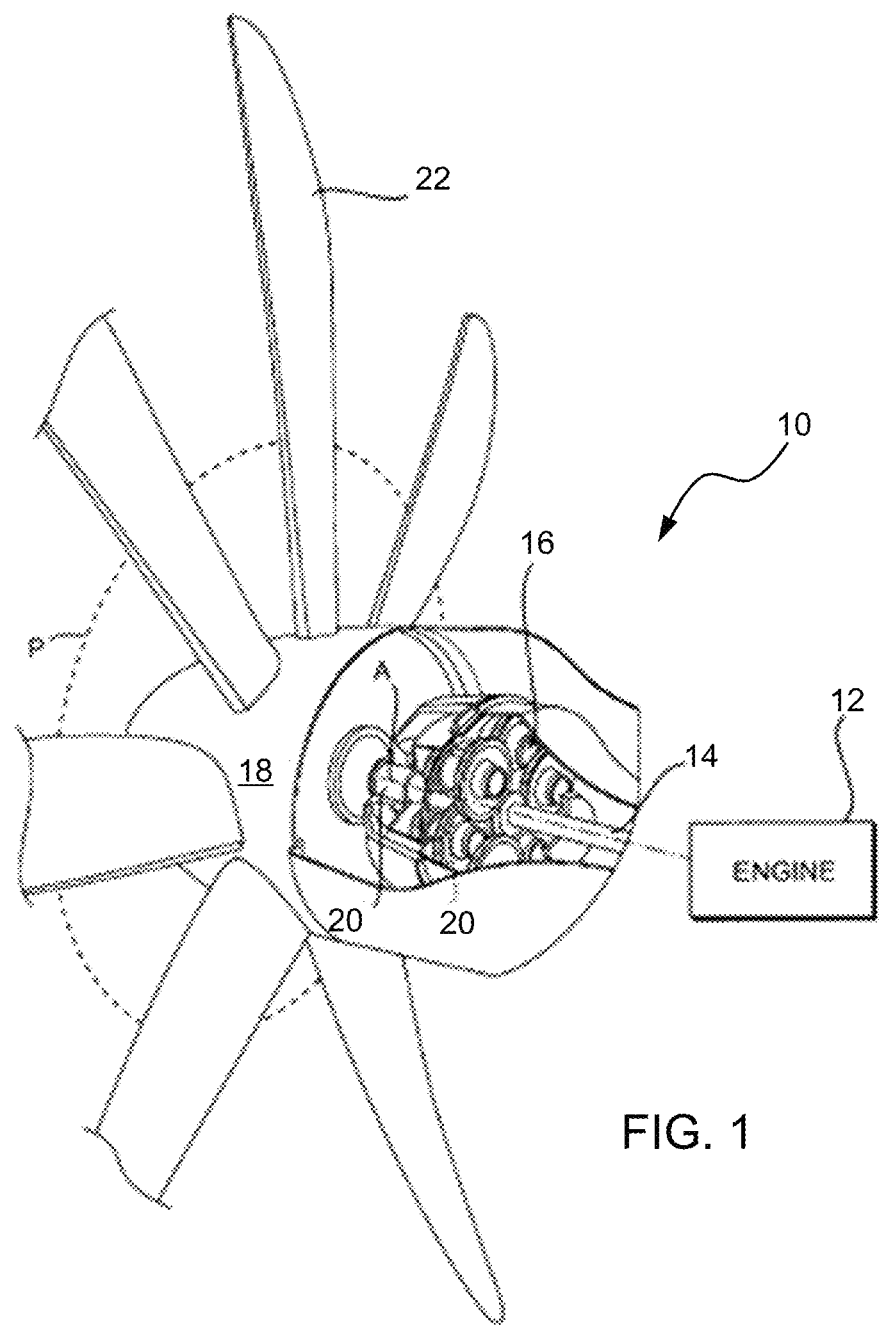
FIG. 1 illustrates an example propeller system driven by a gas turbine engine according to an embodiment of the invention.

Referring to the drawings, FIG. 1 illustrates a general perspective view of a propeller system 10 driven by a turbine engine (illustrated schematically at 12) according to an embodiment of the invention. As illustrated, the propeller system 10 includes a gear reduction gearbox 16, a propeller hub assembly 18, a propeller shaft 20, and propeller blades 22. The engine 12 is mechanically connected to the propeller system 10 by the turbine output shaft 14. The turbine output shaft 14 is mechanically connected to the gearbox 16. The gearbox 16 is coupled to the hub assembly 18 through a propeller shaft 20. Propeller blades 22 extend outwardly from the hub assembly 18. A hub axis A is substantially perpendicular to a plane P which is defined by the propeller blades 22. In operation, the engine 12 rotates the turbine output shaft 14 at a high speed to drive the gear reduction gearbox 16. The gearbox 16 decreases shaft rotation speed of the propeller shaft 20 relative to the turbine output shaft 14 and increases output torque to rotate the hub assembly 18 and the plurality of propeller blades 22.

Figure 2:
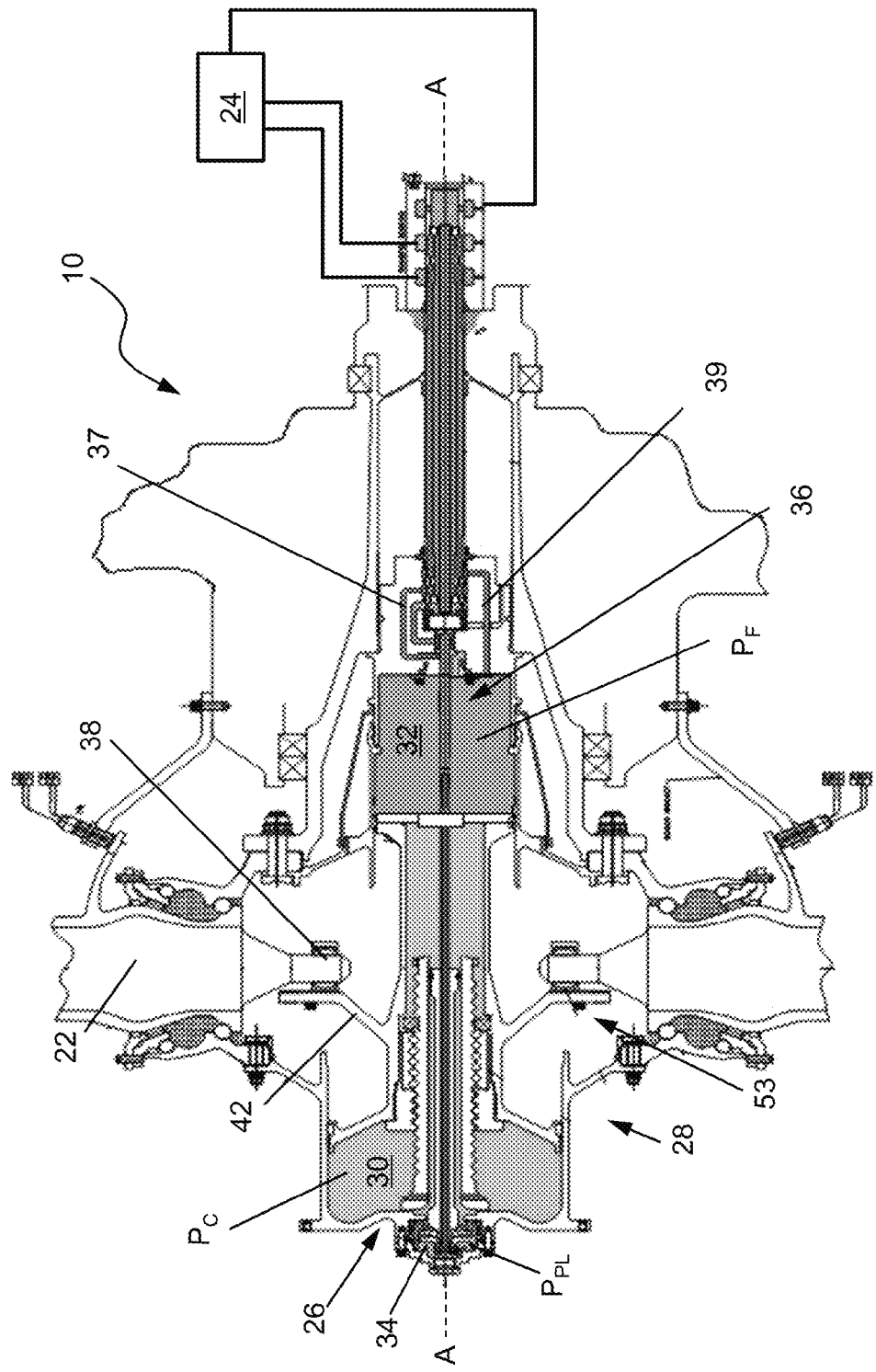
FIG. 2 illustrates a view of an embodiment of a propeller system.

FIG. 2 illustrates a cross-sectional view of the propeller system 10 including a schematic view of a fluid transfer housing 24 according to an embodiment of the invention. As illustrated, the fluid transfer housing 24 is in fluid connection with the propeller system 10 and provides hydraulic pressure from a pressure source (not shown) for actuating the various mechanisms disclosed herein. For example, a hydraulic pressure system in communication with the fluid transfer housing 24 provides hydraulic fluid at a coarse pitch pressure $P_C$ to a coarse pitch pressure chamber 30, provides hydraulic fluid at fine pitch pressure $P_F$ to fine pitch pressure chamber 32, and provides hydraulic fluid at pitchlock pressure $P_{PL}$ to pitchlock pressure chamber 34. Transfer tube assembly 36 is configured with two concentric transfer tubes one within the other for communicating fluid to the pitchlock system 26 and the pitch change system 28. Particularly, Pitchlock pressure $P_{PL}$ is communicated to the pitchlock system 26 through an inner concentric transfer tube while coarse pitch pressure $P_C$ is communicated to the coarse pitch pressure chamber 30 through an outer concentric transfer tube. Further, fine pitch pressure $P_F$ is supplied to fine pitch pressure chamber 32 through transfer tube 39. The pitch change system 28 includes a pitch change actuator piston 42 that translates along axis A to drive a yoke assembly 53. The yoke assembly 53 is attached to propeller blades 22 through a blade pin 38 which extends from each propeller blade 22 in order to control the pitch therof. In operation, generally, by selectively communicating coarse pitch pressure $P_C$ and fine pitch pressure $P_F$ to the pitch change system 28, speed governing, synchrophasing, beta control, feathering and unfeathering of the propeller blades 22 is hydraulically provided.

Figure 3:
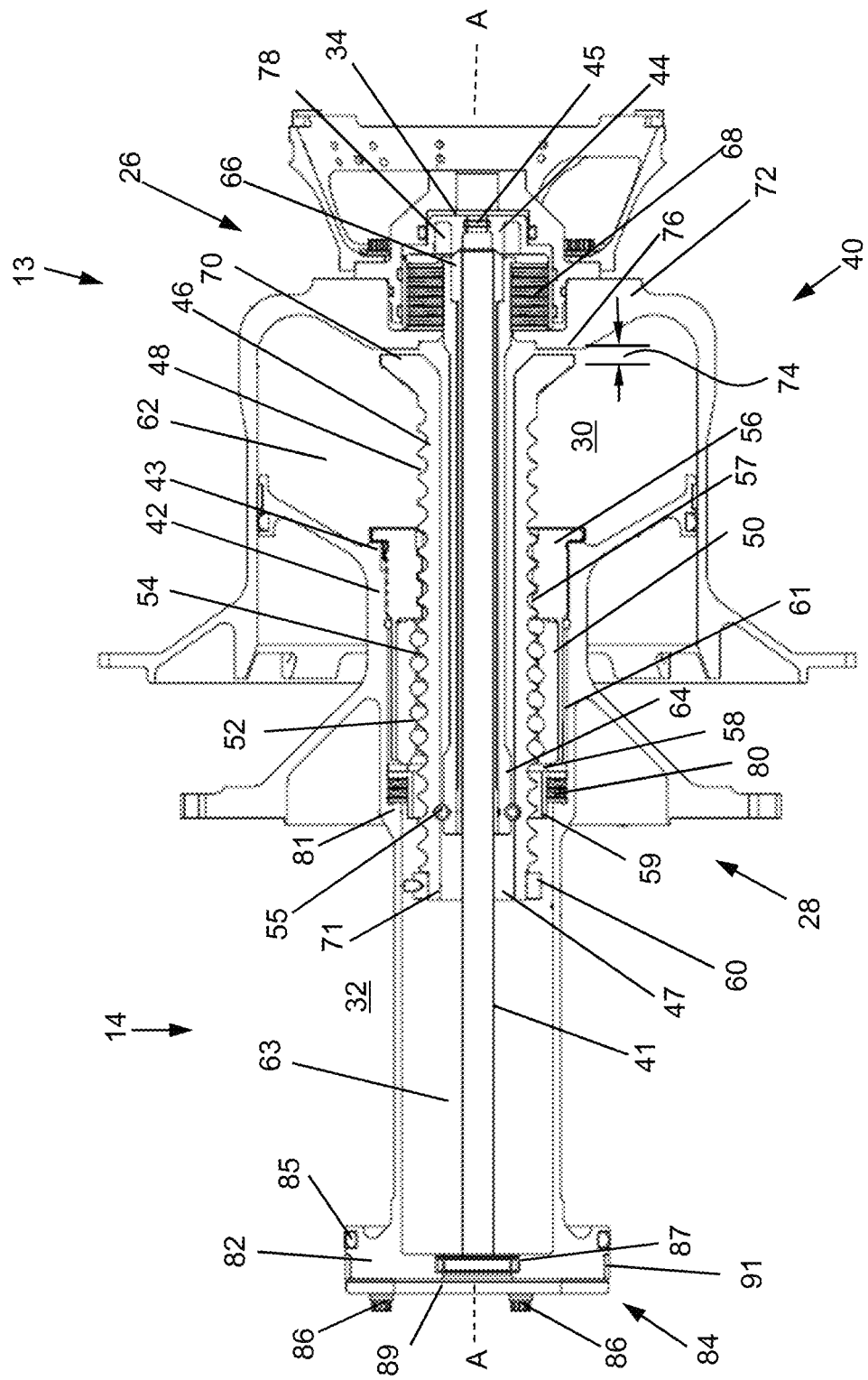
FIG. 3 is a cross-sectional view of an embodiment of a pitchlock system during normal operation.

FIG. 3 illustrates a cross-sectional view of a pitch change system 28 operatively connected to a pitchlock system 26 according to an embodiment of the invention. As illustrated, the pitch change system 28 includes a pitch change actuator 40 with a pitch change actuator piston 42. The pitch change actuator piston 42 is attached to propeller blade 22 (FIG. 2) through a blade pin 38 (FIG. 2) in order to control the pitch thereof. In an embodiment, the pitch change actuator piston 42 is located between the coarse pitch pressure chamber 30 and the fine pitch pressure chamber 32. The chambers 30, 32 are respectively supplied with coarse pitch pressure $P_C$ and fine pitch pressure $P_F$ from fluid transfer housing 24 (FIG. 2). Also shown, pitch change actuator 40 has an actuator dome cover 72 that defines an actuator cavity 62. Actuator cavity 62 partially receives the pitchlock system 26. Pitch change actuator piston 42 is generally tubular and emanates at a first end 43 (i.e., forward end) and terminates at a directly opposite flanged end 82 (i.e., aft end). The first end 43 resides within actuator cavity 62 while the flanged end 82 resides in chamber 32 at the generally aft end 14 of the pitch change actuator 40. Also, pitch change actuator piston 42 defines a plurality of internal cavities having multiple internal diameters. Specifically, pitch change actuator piston 42 includes a first cavity 61 that is defined from first end 43 to actuator piston flange 81 and a second cavity 63 that is defined from actuator piston flange 81 to flanged end 82. The second cavity 63 is contained by seal assembly 84. In operation, first and second cavities 61, 63 are connected to form a continuous cavity with coarse pitch pressure chamber 30 in pitch change actuator 40. In an embodiment, first cavity 61 has a larger internal diameter than the internal diameter of second cavity 63. It should be appreciated that pitch change actuator piston 42 provides a unitary structure for controlling pitch change and simplifies the actuator design over conventional actuators that provide for additional components that connect to form a pitch change actuator.

Also illustrated, pitch change actuator piston 42 includes a seal assembly 84 at a flanged end 82. The seal assembly 84 includes an outer seal 85 and an inner seal 87. Outer seal 85 is a generally annular O-ring with an oval cross-section that resides in a groove on the outside diameter of flanged end 82. Also, a retaining plate 89 is coupled to flanged end 82 by a plurality of bolts 86 or screws, etc. and is configured to hold a glide ring 91 against the flanged end 82. Further, seal assembly 84 includes an inner seal 87 that resides on an inner diameter of the flanged end 82. The inner seal 87 is also generally annular in shape with an oval cross-section and seals an outer diameter of the outer concentric transfer tube 41 of transfer tube assembly 36 (See FIG. 2) which seals the area that communicates with coarse pitch pressure chamber 30. The inner concentric transfer tube of transfer tube assembly 36 (See FIG. 2) traverses the bore of the outer concentric transfer tube 41 and is sealed with the seal 45 within the pitchlock piston 44. In operation, the pitch change actuator piston 42 translates along axis A when selective differential pressures $P_C$ and $P_F$ are applied to respective pressure chambers 30, 32. It should be understood that relative positional terms such as "forward," and "aft," and the like are with reference to the normal operational attitude of the vehicle and should not be considered otherwise limiting.

Also illustrated, the pitchlock system 26 includes, traversing forward 13 to aft 14 in the figure, a pitchlock piston 44, a pitchlock actuation rod 64, a pitchlock retainer pin 66 axially coupled to actuation rod 64, one or more pitchlock piston springs 68 also called (belleville springs or washers 68) that are provided radially outboard of actuation rod 64, a ballscrew screw 46 having external helical ballscrew track grooves 48, a pitchlock nut 56 having complementary internal pitchlock nut threads 57, and a ballscrew ballnut 50 having complementary internal ballnut track grooves 52. The ballscrew track grooves 48 on the ballscrew screw 46 has a helix angle that matches the helix angle of the pitchlock nut threads 57 of the pitchlock nut 56 and ball nut track grooves 52 of the ballscrew ballnut 50. The ballscrew screw 46 includes a ballscrew screw flange 70 at an axially forward end 13 of the ballscrew screw 46 while a collar member 60 is coupled to the aft end 71 of the ballscrew screw 46. The collar member 60 is generally ring-shaped and is coupled to the aft end 71 in order to prevent the ballscrew ballnut 50, pitchlock screw ball bearings 54 and ballscrew screw 46 from coming apart during assembly. The relatively simpler collar member 60 provides easier installation of the pitchlock system 26 over conventional pitchlock systems.

Also, the ballscrew screw 46 cooperates with the ballscrew ballnut 50 whereby a plurality of pitchlock screw ball bearings 54 are supported within the continuous ballscrew track grooves 48 and ballnut track grooves 52. The pitchlock screw ball bearings 54 provide the dynamic interface between the ballscrew ballnut 50 and the ballscrew screw 46 whereby the pitchlock screw ball bearings 54 travel in the mating surfaces of the ballscrew ballnut 50 and the ballscrew screw 46 as they travel relative to each other. Also, the actuation rod 64 resides within the longitudinal cavity 47 of the ballscrew screw 46 and a plurality of ball bearings 55 are inserted into a groove formed on an internal surface of the actuation rod 64 and reside between the actuation rod 64 and the ballscrew screw 46, as will be shown and described below in reference to FIGS. 5A-5C. The plurality of ball bearings 55 provide the dynamic interface between the actuation rod 64 and the ballscrew screw 46 as the actuation rod 64 rotates with respect to the ballscrew screw 46 when the pitch change actuator piston 42 is stroking. The ball bearings 55 also provide a "ground" for the ballscrew screw 46 relative to the actuator dome cover 72 and pull the ballscrew screw 46 into pitchlock via the belleville springs 68. In one non-limiting example, the ball bearings 55 may include multiple steel balls and multiple smaller diameter plastic balls (i.e., smaller diameter than the diameter of the steel balls) being inserted every other steel ball so as to prevent the steel balls from touching each other.

Also, the ballscrew screw flange 70 is spaced away from an axially fixed actuator dome cover 72 during normal operation by a pitchlock gap 74. The ballscrew screw 46 rotates within the bearing assembly 60 and the bearing assembly 60 is also axially translatable within the cavities 61, 63 of the pitch change actuator piston 42. The ballscrew ballnut 50 abuts the pitchlock nut 56 at one end and also abuts a flange 58 in a generally cylindrical plug 59 at an opposite end. Additional washers may also be provided between the ballscrew ballnut 50 and the flange 58. The plug 59 provides an axial load on the ballscrew ballnut spring assembly 80 where the ballnut spring biases the ballscrew ballnut 50 toward the pitchlock nut 56. In one example, the ballnut spring assembly 80 may include one or more belleville springs, however, other similar springs may also be utilized without departing from the scope of the invention. Additionally, the ballscrew ballnut spring assembly 80 abuts and is held against the actuator piston flange 81 through one or more washers. The washer and ballscrew ballnut spring assembly 80 are sized for a specific diameter that permits travel within the cavity 61 however prevents travel in the aft direction 14 past the actuator piston flange 81.

Also shown, the pitchlock piston 44 is provided at an axially forward end 13 of the pitchlock retainer pin 66 and resides on an external face of the actuator dome cover 72. The pitchlock piston 44 also defines a cavity that contains a belleville springs 68 therein. In one example, the belleville springs 68 may include one or more belleville springs, however, other similar springs may also be utilized without departing from the scope of the invention. The pitchlock piston 44 is in communication with an inner concentric transfer tube of transfer tube assembly 36 (See FIG. 2) which supplies the pitchlock pressure chamber 34 with fluid at pitchlock pressure $P_{PL}$ from fluid transfer housing 24 (See FIG. 2). The pitchlock piston 44 is located to separate a pitchlock piston coarse pitch pressure chamber 78 from pitchlock pressure chamber 34. The pitchlock piston coarse pitch pressure chamber 78 is supplied with coarse pitch pressure $P_C$ and the pitchlock pressure chamber 34 is supplied with the pitchlock pressure $P_{PL}$. The pitchlock pressure $P_{PL}$ is at least equivalent to the coarse pitch pressure $P_C$ to generally balance the pitchlock piston 44 there between. It should be understood that the pitchlock pressure $P_{PL}$ may be greater than the coarse pitch pressure $P_C$ by a predetermined amount such that the pitchlock piston 44 is actuated in response to a predetermined difference there between. It should be understood that the hydraulic pressure system disclosed herein is illustrated somewhat schematically as various pressure communication circuits may be utilized with the present invention.

During normal operating conditions, as shown in FIG. 3, the pitch change actuator piston 42 is selectively driven along axis A by a differential pressure between $P_C$ and $P_F$ (FIG. 2). The ballscrew screw 46 rotationally translates relative to the ballscrew ballnut 50 and the pitchlock nut 56. The ballscrew ballnut spring assembly 80 provides an axial preload on the ballscrew ballnut 50 relative to the pitchlock nut 56 to ensure that under normal operating conditions, the ballscrew screw 46 operates through the pitchlock screw ball bearings 54. Also, the ballscrew screw 46, ballscrew ballnut 50, and pitchlock nut 56 are disposed and configured such that, as the pitch change actuator piston 42 moves axially along axis A, the ballscrew screw 46 axially and rotationally advances or retreats through the ballscrew ballnut 50 and pitchlock nut 56 over the length of the ballscrew screw 46. Also, pitchlock pressure $P_{PL}$ from fluid transfer housing 24 (FIG. 2) is communicated to the pitchlock piston 44 in order to compress the belleville springs 68 and cause the ballscrew screw 46 to axially and radially translate in the forward 13 or aft 14 directions along axis A and maintain the pitchlock gap 74 which prevents the ballscrew screw flange 70 from contacting a front surface 76 of the actuator dome cover 72.

Figure 4:
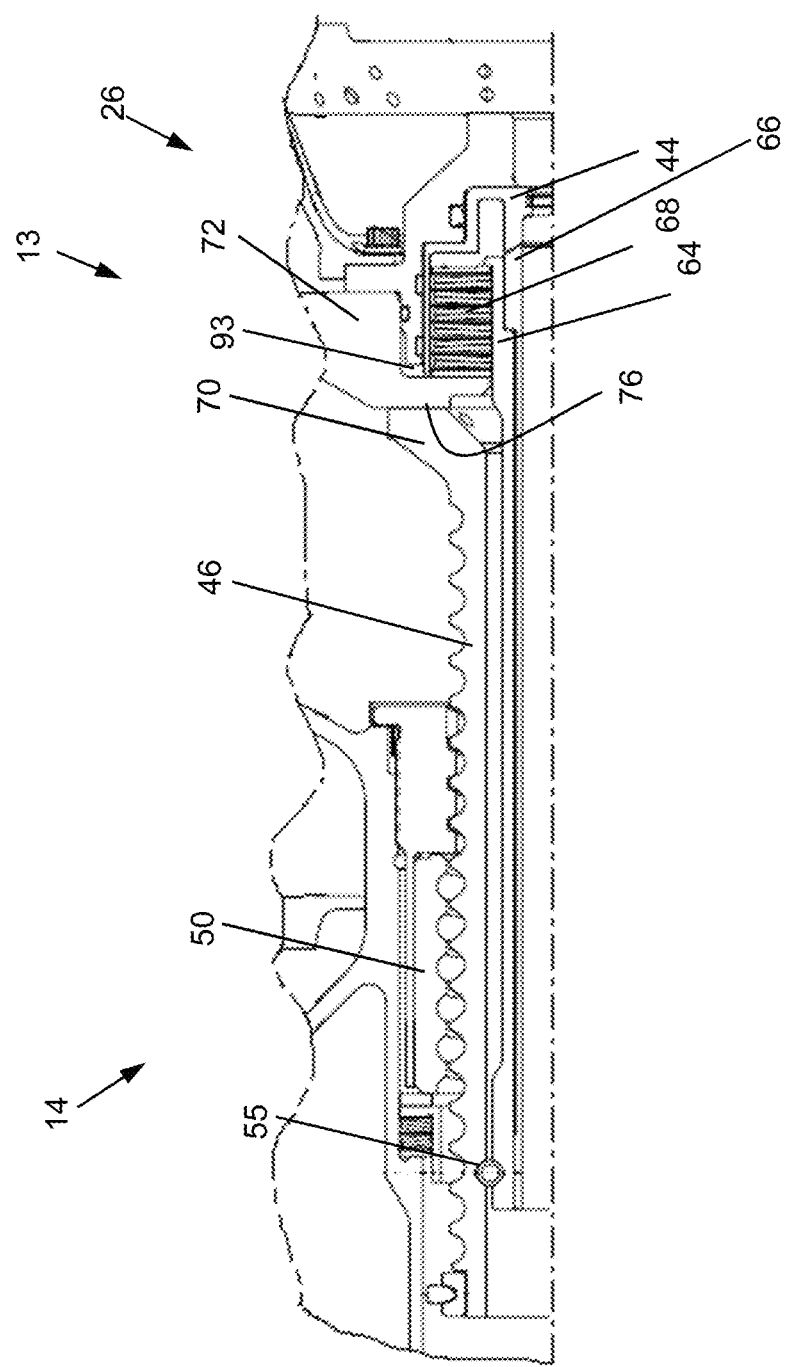
FIG. 4 is a cross-sectional view of an embodiment of a pitchlock system during pitchlock operation.

Referring to FIG. 4, when the propeller system is commanded to pitchlock such as by a decrease in coarse pitch pressure $P_C$ which may result from a loss of hydraulic pressure failure, or by dumping of the pitchlock pressure $P_{PL}$, the pitchlock system 26 is hydraulically initiated. Once the hydraulic pressure $P_{PL}$ on the pitchlock piston is removed, the pitchlock piston 44 and the pitchlock actuation rod 64 are biased to the forward end 13 (i.e., to the right in FIG. 4) and to the axially fixed actuator dome cover 72 by the belleville springs 68. The belleville springs 68 pull the actuation rod 64 to the right in FIG. 4, the ball bearings 55 pull the ballscrew screw 46 to the right in FIG. 4 until the flange 70 of the ballscrew screw 46 contacts or engages a front surface 76 of the actuator dome cover 72. As the pitchlock actuation rod 64 strokes, the ballscrew ballnut 50 also strokes to drive the ballscrew screw 46 towards the axially fixed actuator dome cover 72 and toward the forward end 13. As a result, the ballscrew screw flange 70 contacts an interior surface 76 of the actuator dome cover 72 and closes the pitchlock gap 74 (appreciable pitchlock gap 74 is shown more clearly in FIG. 3). The load from the belleville springs 68 holds the ballscrew screw flange 70 against the actuator dome cover 72. Contact with the axially fixed actuator dome cover 72 generates a torsional and an axial resistance which grounds the ballscrew screw 46 and locks the propeller blades 22 (shown in FIG. 2) in their last pitch position. In order to disengage pitchlock, fluid is supplied to the pitchlock pressure chamber 34 (See FIG. 3) generating a pitchlock pressure $P_{PL}$ and causing the pitchlock pressure $P_{PL}$ to push the pitchlock piston 44 to the left in FIG. 4 (i.e., towards the aft end 14). This compresses the belleville springs 68 against the actuator dome cover 72 by pushing the pitchlock retainer pin 66 to the left in FIG. 4 and further pushes the actuation rod 64 and the ball bearings 55 to the left in the FIG. 3 (i.e., towards the aft end 14).

Figure 5A:
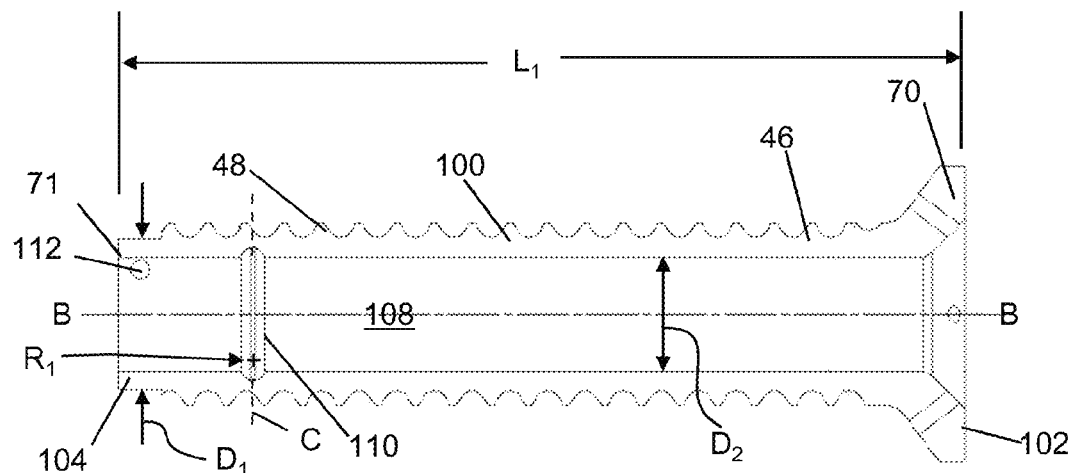
FIG. 5A is a cross-sectional view of a ballscrew screw shown in FIGS. 2-4 according to an embodiment of the invention.

FIG. 5A illustrates a cross-sectional view of a pitchlock ballscrew screw 46 according to an embodiment of the invention. Pitchlock ballscrew screw 46 has a generally tubular body 100 with a length $L_1$ from first end 102 to second/aft end 71. The tubular body 100 is aligned along longitudinal axis B and has a plurality of helical ballscrew track grooves 48 provided on an outer circumferential surface of the body 100. The ballscrew track grooves 48 traverse the length of the body 100 between a generally cylindrical ballscrew screw flange 70 at a first end 102 and a generally smooth portion 104 having diameter $D_1$ at an aft end 71. The smooth portion 104 has an external diameter $D_1$ that is sized to receive a complementary collar member 60 (See FIG. 3). The body 100 has a generally uniform bore 108 (i.e., having a uniform internal diameter) aligned along the longitudinal axis B with an internal diameter $D_2$ from first end 102 to aft end 71. Also, the body 100 has a generally circumferential channel or groove 110 formed along an interior surface aligned along axis C and with a radius $R_1$. The circular groove 110 provides a connection to the mating ball bearings 55 (See FIG. 3) that are contained within the groove 110 through the pitchlock actuation rod 64, which will be described below with reference to FIG. 5B. Also, a through-aperture 112 is formed on portion 104 and is provided to mate with a retainer pin (not shown) of the collar member 60 (See FIG. 3). In an embodiment, length $L_1$ is about 314.99 mm to about 315.01 mm, diameter $D_1$ is sized to receive a collar member 60 (See FIG. 3) having an internal diameter of about 56.49 mm to about 56.51 mm, diameter $D_2$ is about 42.34 mm to about 42.36 mm, the radius $R_1$ is about 4.492 mm to about 4.512 mm, and the diameter $D_4$ is about 6.99 mm to about 7.01 mm.

Figure 5B:
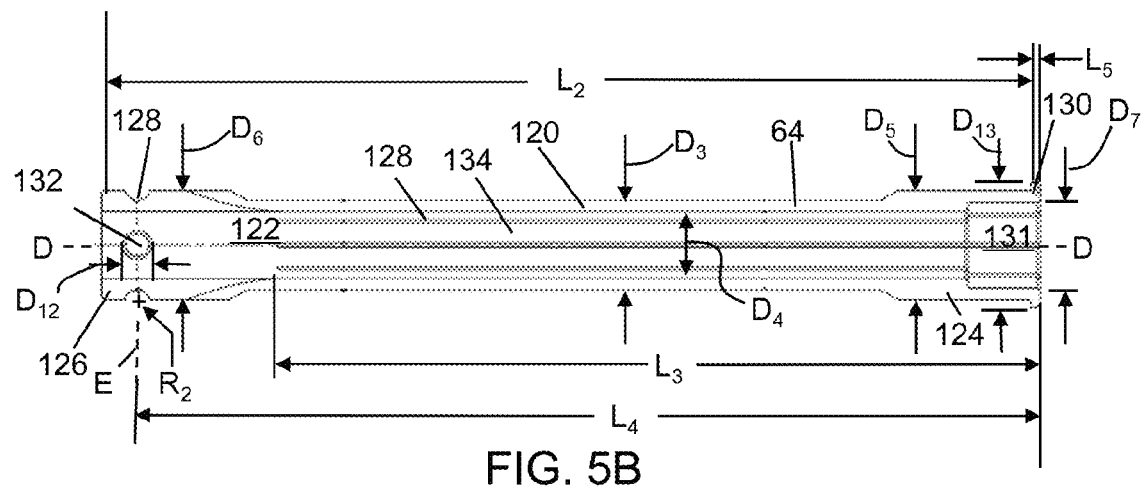
FIG. 5B is a cross-sectional view of a pitchlock actuation rod shown in FIGS. 2-4 according to an embodiment of the invention.

FIG. 5B illustrates a cross-sectional view of a pitchlock actuation rod 64 according to an embodiment of the invention. Pitchlock actuation rod 64 has a generally tubular body 120 with an external diameter $D_3$ longitudinally oriented along axis D. Body 120 also includes a generally uniform bore 122 having an internal diameter $D_4$ traversing the longitudinal length $L_2$ of body 120 with the exception of a larger diameter bore 131 formed at first bulbous portion 124. Bores 122, 131 form a continuous opening through body 120. Body 120 has a first bulbous portion 124 at a generally forward end (i.e., to the right in FIG. 5B) with an external diameter $D_5$, an internal bore 131 having an internal diameter $D_7$, and an external flange $D_{13}$. Also, body 120 includes a second bulbous portion 126 directionally opposite first bulbous portion 124 at an aft end (i.e., to the left in FIG. 5B) and having an external diameter $D_6$. Body 120 also includes a plurality of uniformly spaced longitudinal slots 128 that are aligned along longitudinal axis D of the body 120 for a length $L_3$ which is inclusive of length of circular flange $L_5$. The longitudinal slots 128 facilitate the body 120 to be compressed when it is inserted into the through-bore of the belleville springs 68 (FIG. 3) during assembly.

Also, first bulbous portion 124 terminates into a generally circular flange 130 having a length $L_5$ while second bulbous portion 126 includes a ball-bearing race 128 having a radius $R_2$ circumferentially disposed on its outer surface. The circular flange $L_5$ includes interruptions caused by longitudinal slots 128. The ball-bearing race 128 is aligned at axis E and is at a distance of length $L_4$ from the flange 130. Additionally, a through-aperture or ball bearing aperture 132 that is aligned along axis E and having an internal diameter $D_{12}$ is formed at portion 126. When the pitchlock actuation rod 64 is inserted into the bore 108 of ballscrew screw 46, the axis E aligns with axis C (See FIG. 5A) whereby ball bearings 55 (FIG. 3) that are inserted into ball bearing aperture 132 from the interior of bore 122 are communicated circular groove 110 (See FIG. 5A). In an embodiment, length $L_2$ is about 326.69 mm to about 326.71 mm, length $L_3$ is about 257.99 mm to about 258.01 mm, length $L_4$ is about 257.99 mm to about 258.01 mm, $L_5$ is about 3.29 mm to about 3.31 mm, diameter $D_3$ is about 31.42 mm to about 31.44 mm, diameter $D_4$ is about 23.46 mm to about 23.48 mm, diameter $D_5$ is about 38.31 mm to about 38.33 mm, diameter $D_6$ is about 38.31 mm to about 38.33 mm, internal diameter $D_7$ is about 29.99 mm to about 30.01 mm, $D_{12}$ is about 8.09 mm to about 8.11 mm, $D_{13}$ is about 38.35 mm to about 38.37 mm, and radius R is about 4.492 mm to about 4.512.

Figure 5C:
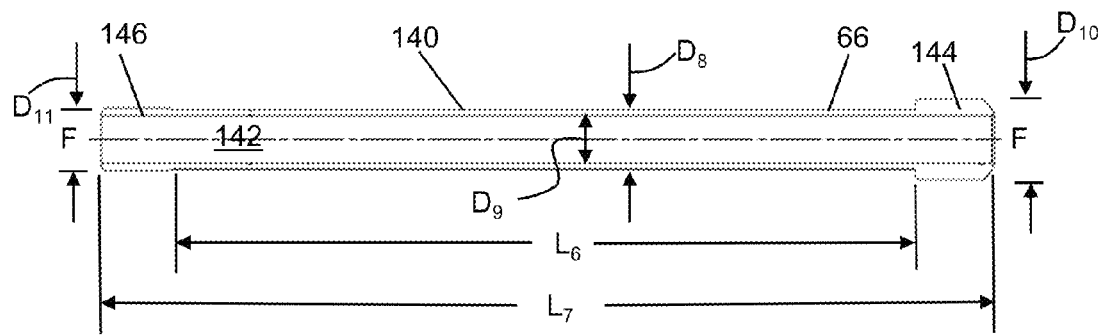
FIG. 5C is a cross-sectional view of a pitchlock retainer pin shown in FIGS. 2-4 according to an embodiment of the invention.

FIG. 5C illustrates a cross-sectional view of a pitchlock retainer pin 66 according to an embodiment of the invention. Pitchlock retainer pin 66 has a generally tubular body 140 longitudinally aligned along axis F and having an external diameter $D_8$ for length $L_6$. Body 140 also includes a generally uniform through-bore 142 having an internal diameter $D_9$ traversing the longitudinal length $L_7$ of body 140. Body 140 has a first bulbous portion 144 with an external diameter $D_{10}$ at the forward end (i.e., to the right) and a second bulbous portion 146 with an external diameter $D_{11}$ at a directionally opposite aft end. In an embodiment, length $L_6$ is about 279.19 mm to about 279.21 mm, length $L_7$ is about 638.75 mm to about 638.77 mm, diameter $D_8$ is about 21.99 mm to about 22.01 mm, diameter $D_9$ is about 17.79 mm to about 17.81 mm, diameter $D_{10}$ is about 29.99 mm to about 30.01 mm, and diameter $D_{11}$ is about 23.33 mm to about 23.34 mm.

Figure 5D:
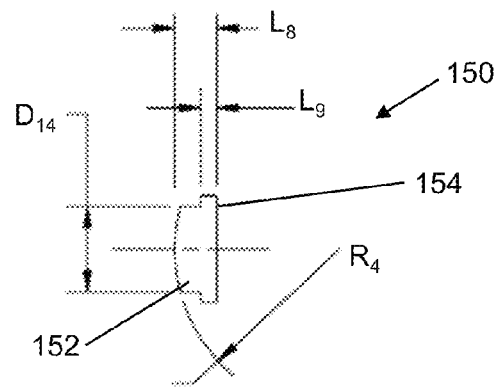
FIG. 5D illustrates a cross-sectional view of a metallic pin for use with pitchlock retainer pin shown in FIGS. 2-4 according to an embodiment of the invention

FIG. 5D illustrates a cross-sectional view of a metallic pin 150 for use within aperture 132 of pitchlock actuation rod 64 (See FIG. 5B) according to an embodiment of the invention. Pin 150 may be a generally cylindrical pin made of metal, with a length $L_8$ having a body 152 that is configured to fit into aperture 132 (See FIG. 5B) and a flanged head 154. The body 152 has an external diameter $D_{14}$ with a face having a radius $R_4$. Also, flanged head 154 is generally slightly larger than diameter $D_{12}$ (See FIG. B) and having a length $L_9$. In an embodiment, length $L_8$ is about 3.95 mm to about 3.97 mm, length $L_9$ is about 1.49 mm to about 1.51 mm, diameter $D_{14}$ is about 8.09 mm to about 8.11 mm, and radius $R_4$ is about 15.6125 mm to about 15.6325 mm.

With reference to FIGS. 2-5D, a method of assembling a portion of the pitchlock system 26 according to an embodiment includes several steps. Initially, the actuator dome cover 72, actuator piston 42 of the yoke assembly 53, and ballscrew screw 46 are assembled together. During this initial assembly, referring to FIG. 3, the pitchlock nut 56 is threaded around the ballscrew track grooves 48 at the aft end 14. Pitchlock screw ball bearings 54 are coupled within the ballscrew track grooves 48 and the ballscrew ballnut 50 is inserted around the ballscrew track grooves 48 at the aft end 14 until the ballscrew ballnut 50 abuts pitchlock nut 56. In an embodiment one or more washers are coupled to ballscrew ballnut 50 at its aft end 14 and ballscrew ballnut spring assembly 80 is coupled to the actuator piston 42 by inserting the ballscrew ballnut spring assembly 80 at the aft end 14. The assembly is balanced within the actuator piston 42 by coupling the collar member 60 at the aft end 71 of the ballscrew screw 46. The ballscrew screw 46 including the attached components are inserted into cavity 61 of actuator piston 42 starting at the right in FIG. 3 until the ballscrew ballnut spring assembly 80 abuts the actuator flange 81. In an embodiment, the ballscrew ballnut spring assembly 80 may be inserted until it is compressed by the actuator flange 81 upon application of force in the aft direction 14. Further, the pitchlock nut 56 traverses cavity 61 until the flange of the pitchlock nut 56 abuts first end 43.

Further assembly includes inserting the pitchlock actuation rod 64 into the ballscrew screw 46. Particularly, pitchlock actuation rod 64 is inserted into the ballscrew screw 46 immediately adjacent flange 70 (i.e., on the right in FIG. 3) until axis C (See FIG. 5A) aligns with axis E (See FIG. 5B). In this sub-assembly, bulbous portion 126 of pitchlock actuation rod 64 is inserted into bore 108 of ballscrew screw 46 at its first end 102 until it traverses the bore 108 along axis A and axes C and E align (See FIGS. 5A-5B). The bulbous portion 126 of pitchlock actuation rod 64 is smaller that bore 108 and does not engage bore 108. Also diameter $D_{13}$ of flange 130 is smaller than bore 108 and easily slides through bore 108. Further assembly includes, referring to FIGS. 3 and 5A-5D, inserting ball bearings 55 into the pitchlock actuation rod 64 by inserting the ball bearings 55 into the ball bearing aperture 132 by accessing the aperture 132 from bore 122 within the interior cavity of pitchlock actuation rod 64. Once the ball bearings 55 are inserted, a pin 150 is inserted into the aperture 132 from bore 122 in order to prevent the ball bearings 55 from rolling back into the aperture 132. Further, a body of a rubber plug or other similar plug (not shown) is inserted into the bore 122 of actuation rod 64 in order to retain the pin 150 in the aperture 132 and prevent the ball bearings 55 from disassembling while further assembly of the pitchlock system 26 is performed.

Next, the belleville springs 68 are compressed and restrained against an external face of the actuator dome cover 72 and the pitchlock actuation rod 64 and its associated assembly with ballscrew screw 46 is inserted into the belleville springs 68. Particularly, as illustrated in FIGS. 2-5C, a suitable compression fixture may be utilized to compress the belleville springs 68 within a cavity 93 (See FIG. 4) at a forward end of the actuator dome cover 72. It is to be appreciated that the compression fixture also provides suitable access for insertion of the pitchlock actuation rod 64 and its assembly through cavity 30 as will be described below. Once the belleville springs 68 are compressed, the pitchlock actuation rod 64 together with the assembled ball bearings 55, ballscrew screw 46, yoke assembly 53, and actuator piston 42 are inserted into the actuator dome cover 72 at the aft end 14 until the ballscrew screw 46 generally resides within the chamber 30.

In an embodiment, bulbous portion 124 of pitchlock actuation rod 64 is inserted into actuator dome cover 72 and into the through-bore of the belleville springs 68. As diameter $D_{13}$ of bulbous portion 124 in pitchlock actuation rod 64 is generally larger than the through-bore of belleville springs 68, the bulbous portion 124 and flange 130 are compressed radially as it traverses the belleville springs 68. The slots 128 within the actuation rod 64 permits it to be compressed as it slides through the belleville springs 68. The flange 130 of the pitchlock actuation rod 64 passes through the belleville springs 68 and clicks/snaps into place at the exposed end of the belleville springs 68 until the flange 130 of pitchlock actuation rod 64 abuts an external face of the belleville springs 68.

Further assembly includes inserting the pitchlock retainer pin 66 into the pitchlock actuation rod 64 at the forward end 13 (i.e., to the right in FIG. 3) in order to retain the pitchlock actuation rod 64 within the pitchlock system 26 and maintain assembly. Particularly, and referring FIGS. 3 and 5A-5C, the bulbous portion 146 of pitchlock retainer pin 66 is inserted into the internal bore 131 of pitchlock actuation rod 64 until pitchlock retainer pin 66 resides within the internal bore of actuation rod 64. As the pitchlock retainer pin 66 traverses the internal bore 122, it contacts the rubber plug in the bore 122 of pitchlock actuation rod 64 (See FIG. 5B) and displaces the rubber plug from the pitchlock actuation rod 64. As the external diameter $D_{10}$ of bulbous portion 144 is generally about the same internal diameter $D_7$ of bore 131, the pitchlock retainer pin 66 locks the assembly in place and the pitchlock retainer pin 66 covers the ball bearing aperture 132 and retains pin 150 in aperture 132 and prevents the ball bearings 55 from exiting the groove 110. Once the pitchlock retainer pin 66 is inserted, the compression fixture is released from the belleville springs 68 causing the belleville springs 68 to be trapped by the flange 130 of the pitchlock actuation rod 64. This causes the belleville springs 68 to pull the pitchlock actuation rod 64 to the forward end 13 (i.e., to the right in FIG. 3) and engaging the ballscrew screw 46 and the actuator dome cover 72. Now, ball bearings 55 within the pitchlock actuation rod 64 reside between the actuation rod 64 and the ballscrew screw 46. Further assembly includes inserting the pitchlock piston transfer tube 36 into the through-bore 142 of the pitchlock retainer pin 66 and seal 84 is attached to second end 82 by a plurality of bolts 86. Further, the pitchlock piston 44 is inserted over the external washers including the belleville springs 68 which are contained within and held in place by a plurality of bolts.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A pitchlock system comprising:
   a ballscrew screw mounted along an axis of rotation of an actuator, the ballscrew screw having an internal ballscrew bore;
   a pitchlock nut mounted about the ballscrew screw, the pitchlock nut including an internal pitchlock nut thread;
   a ballscrew ballnut mounted about the ballscrew screw and axially adjacent the pitchlock nut;
   a pitchlock actuation rod mounted axially within the internal ballscrew bore, the pitchlock actuation rod having an internal pitchlock actuation bore and a ball bearing aperture for receiving multiple ball bearings;
   a pitchlock retainer pin mounted axially within the internal pitchlock actuation bore; and
   a belleville spring which biases the ballscrew screw towards an axially fixed surface of the actuator in a pitchlock position, the ballscrew screw being movable between an operational position and the pitchlock position.

2. The pitchlock system of claim 1, further comprising:
   a pitchlock piston axially coupled to the pitchlock retainer pin.

3. The pitchlock system of claim 2, wherein the pitchlock piston is configured to bias the ballscrew screw away from the axially fixed surface of the actuator during the operational position.

4. The pitchlock system of claim 1, further comprising:
   a ball bearing bore disposed on an internal surface of the pitchlock actuation rod, the ball bearing bore being configured to receive a multiple of ball bearings.

5. The pitchlock system of claim 1, further comprising:
   a pin coupled to the ball bearing bore and configured to retain the multiple of ball bearings within the ball bearing bore during assembly.

6. The pitchlock system of claim 1, wherein the pitchlock actuation rod includes a flange to react the belleville spring bias toward the axially fixed surface of the actuator in response to the pitchlock position.

7. The pitchlock system of claim 1, wherein the pitchlock actuation rod includes a plurality of slots disposed in a longitudinal direction for at least a portion of a length of the pitchlock actuation rod.

8. The pitchlock system of claim 1, wherein the pitchlock actuation rod further comprises a flange that is configured to lock to an external face of the belleville spring.

9. The pitchlock system of claim 1, further comprising:
an external ballscrew ball track groove helically disposed on the ballscrew screw;
an internal ballnut track groove helically disposed on the ballscrew ballnut;
wherein the internal ballnut track groove and the external screw ball track groove have a common helix angle.

10. A method of assembling a pitchlock system comprising:
mounting a pitchlock nut about a ballscrew screw, the ballscrew screw having an internal ballscrew screw bore and an external ballscrew ball track groove;
mounting a ballscrew ballnut about the ballscrew screw and axially adjacent the pitchlock nut;
inserting a pitchlock actuation rod axially within the internal ballscrew screw bore to form a ballscrew screw assembly, the pitchlock actuation rod having an internal pitchlock actuation bore from a forward end to a second aft end and a ball bearing aperture;
compressing a belleville spring assembly against an external face of an actuator dome cover;
inserting the forward end of the pitchlock actuation rod into the belleville spring assembly from an internal cavity of the actuator dome cover; and
inserting a pitchlock retainer pin axially within the internal pitchlock actuation bore to compress the belleville spring assembly to the actuator dome cover.

11. The method of claim 10, further comprising:
inserting a multiple of ball bearings into the ball bearing aperture prior to the inserting of the pitchlock retainer pin.

12. The method of claim 10, further comprising:
connecting a pitchlock piston to the pitchlock retainer pin.

13. The method of claim 10, wherein the inserting of the pitchlock actuation rod into the belleville spring assembly further comprises:
radially compressing the pitchlock actuation rod during the inserting of the pitchlock actuation rod.

14. The method of claim 10, further comprising locking a flange to an external face of the belleville spring assembly.

15. A propulsion system comprising:
an actuator mounted along an axis, the actuator having an actuator dome that defines an actuator cavity;
a ballscrew screw mounted along an axis of rotation of an actuator, the ballscrew screw having an internal ballscrew bore;
a pitchlock nut mounted about the ballscrew screw, the pitchlock nut including an internal pitchlock nut thread;
a ballscrew ballnut mounted about the ballscrew screw and axially adjacent the pitchlock nut;
a pitchlock actuation rod mounted axially within the internal ballscrew bore, the pitchlock actuation rod having an internal pitchlock actuation bore and a ball bearing aperture for receiving multiple ball bearings;
a pitchlock retainer pin mounted axially within the internal pitchlock actuation bore; and
a belleville spring which biases the ballscrew screw towards an axially fixed surface in the actuator in a pitchlock position, the ballscrew screw being movable between an operational position and the pitchlock position.

16. The propulsion system of claim 15, further comprising:
a pitchlock piston axially coupled to the pitchlock retainer pin.

* * * * *